United States Patent [19]
Ishida et al.

[11] Patent Number: 5,033,594
[45] Date of Patent: Jul. 23, 1991

[54] CHANGE-SPEED CONSTRUCTION FOR PROPELLING SYSTEM OF WORK VEHICLE

[75] Inventors: Arinobu Ishida; Toshihiko Kusano; Naotaka Kanai; Toshiyuki Matsumoto; Shinichi Takeda; Hiroshi Nishikawa; Tokio Horikawa, all of Osaka, Japan

[73] Assignee: Kubota Corporation, Osaka, Japan

[21] Appl. No.: 516,326

[22] Filed: Apr. 30, 1990

[30] Foreign Application Priority Data

Sep. 6, 1989 [JP] Japan .................................. 1-231871
Jan. 16, 1990 [JP] Japan .................................... 2-7751

[51] Int. Cl.⁵ ...................... B60K 41/22; G05G 13/00
[52] U.S. Cl. ............................... 192/3.63; 74/480 R; 74/483 R
[58] Field of Search ................. 192/3.63, 11, 3.51; 74/480 R, 483 R

[56] References Cited

U.S. PATENT DOCUMENTS

3,539,040 11/1970 Edwards ........................... 192/11 X
4,301,902 11/1981 Gatsos et al. ................... 192/3.51 X
4,408,683 10/1983 Elmy et al. ..................... 74/480 R X Primary Examiner—Rodney H. Bonck
Attorney, Agent, or Firm—Webb, Burden, Ziesenhelm & Webb

[57] ABSTRACT

A change-speed construction for a propelling system of a work vehicle. The construction has a neutral return mechanism for causing a stepless transmission to return to the neutral in response to disengagement of a main propelling transmission clutch. Then, when the clutch is engaged again to resume vehicle run after a temporary stop for e.g. replenishment of materials to be worked, the vehicle does not make a sudden start.

8 Claims, 9 Drawing Sheets

CHANGE-SPEED CONSTRUCTION FOR PROPELLING SYSTEM OF WORK VEHICLE

BACKGROUND OF THE INVENTION

1. Field of the Invention

The present invention relates to a change-speed construction for a propelling system of a work vehicle such as a walking operator type agricultural work vehicle or a riding operator type planting machine.

2. Description of the Prior Art

A walking operator type agricultural work vehicle, as an example of work vehicle to which the present invention pertains, includes a stepless change-speed device such as a belt type change-speed device or a hydrostatic type change-speed device (HST) for providing various speeds in the propelling system and the vehicle further includes a main clutch separately of the change-speed device.

In operating such vehicle, the operator sometimes has to adjust a position of a work implement connected with the vehicle body or to replenish materials to be worked with while temporarily stopping the vehicle run by disengaging the main clutch. Then, when the main clutch is engaged again after completion of the above job for resuming the vehicle run, the vehicle may make a sudden and dangerous start if the stepless changes-speed device for the propelling system remains at a certain speed position other than the neutral.

The present invention primarily intends to avoid such sudden vehicle start occuring when the main clutch is engaged again.

SUMMARY OF THE INVENTION

For accomplishing the above-noted object, a change-speed construction for a propelling system of a work vehicle, according to the invention, comprises: a main clutch; a stepless change-speed device; a main clutch control means having a clutching position for engaging the main clutch and a first declutching position for disengaging the main clutch; a stepless change-speed device control means having a neutral position for retaining the stepless change-speed device at a neutral position; and a neutral return mechanism for causing the stepless change-speed device to return to the neutral position and maintaining the device thereat when the main clutch control means is operated to the first declutching position and also for releasing the stepless change-speed device control means from the neutral position when the main clutch control means is operated to the clutching position.

Functions and effects of the above construction will now be described.

According to the above construction of the invention, when the main clutch is disengaged in the course of a vehicle run being effected at a certain speed, the stepless change-speed control means embodied as e.g. a change-speed lever or a change-speed pedal for the stepless change-speed device is forcibly returned to the neutral position.

Thereafter, when the main clutch is engaged again, the stepless change-speed device control means is still retained at the neutral position; and therefore the vehicle will not start immediately. That is, to start the vehicle, the stepless change-speed device control means must be operated to a certain operational position other than the neutral after the re-engaging operation of the main clutch.

As described above, as the stepless change-speed device control means is returned to the neutral position in response to a disengaging operation of the main clutch, the vehicle will not make a sudden and dangerous start when the disengaged main clutch is engaged again for resuming the interrupted vehicle run. Accordingly, the construction of the invention has improved the safety.

Further, when the vehicle run is resumed, the stepless change-speed device control means, which is currently retained at the neutral, is operated to a desired position. Therefore, the operator can always make a proper start at a speed position appropriate for the ground condition.

Further, according to a preferred embodiment of the invention, the main clutch control means has a second declutching position for disengaging said main clutch alone in addition to the first declutching position; the main clutch control means being operable to said clutching position, said second declutching position and to said first declutching position bidirectionally in said order.

With the above, at the second declutching position provided between the clutching position and the first declutching position in the operation order of the main clutch control means, only the main clutch is disengaged. That is, unlike the first declutching position, at this second declutching position the stepless change-speed device is not forcibly returned to the neutral but can be maintained at the currently set position. This additional feature will be appreciated by the operator when he desires to resume the work at the same condition after stopping the vehicle run by disengaging the main clutch, because he does not have to operate the stepless change-speed device for the work implement back to the original position after every interruption of the vehicle run.

Whereas, if the main clutch control means is operated to the first declutching position past the second declutching position, the stepless change-speed device is automatically returned to the neutral. Then, if the control lever is operated from this first declutching position to the clutching position, the vehicle will start running again at a low speed in a smooth manner.

That is, since the second declutching position is provided between the clutching position and the first declutching position, the user can select, according to convenience, whether the second declutching position where only the main clutch is disengaged with no operative connection with the stepless change-speed device or the first declutching position where disengagement of the main clutch causes automatic return of the stepless change-speed device to the neutral.

In effect, the user will benefit from greater freedom in choosing one from the two different states according to his need and experience; that is, one operation mode suitable for an inexperienced operation to always effect low-speed smooth vehicle start, another operation mode for maintaining the current vehicle speed and still another operation mode suitable for an experienced operator to obtain maximum work efficiency.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a change-speed construction for a propelling system of a work vehicle relating to the present invention; in which.

DESCRIPTION OF THE PREFERRED EMBODIMENTS

Preferred embodiments of the invention will now be described in particular with reference to the accompanying drawings.

Figure 1:
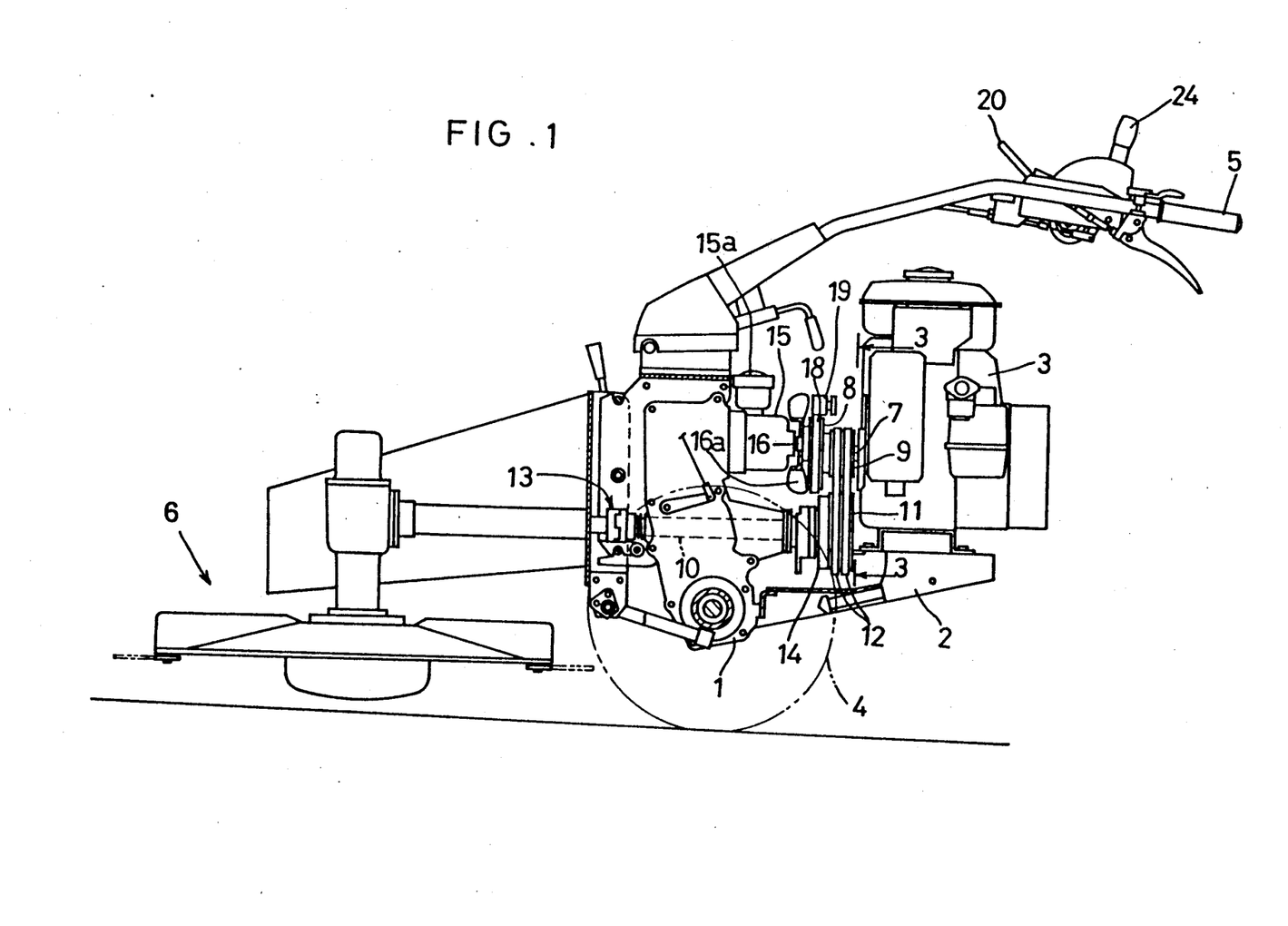
FIG. 1 is an overall side view showing a walking operator type work vehicle having a rotary mower, as one example of the work vehicle.

As shown in FIG. 1, a walking operator type work vehicle includes a transmission casing 1, a vehicle frame 2 extending rearwardly relative to the casing 1, an engine 3 mounted on the frame 2, a pair of right and left propelling wheels 4 attached to a lower side of the transmission casing 1, a steering handle 5 disposed upwardly of the casing 1, and a rotary mower attached to a front side of the transmission casing 1.

Next, a transmission construction from the engine 3 to the transmission casing 1 will be described. As shown also in FIG. 1, an output shaft 7 extends from a front face of the engine 3 to the transmission casing 1. This output shaft 7 carries a first output pulley 8 and a second output pulley 9. On the other hand, a PTO input shaft 10 extends through a lower portion of the transmission casing 1 in the longitudinal direction of the casing 1. This PTO input shaft 10 carries, at an end thereof adjacent the engine 3, an input pulley 11. Then, a pair of transmission belts 12 are entrained between and on the second output pulley 9 fitted on the output shaft 7 of the engine 3 and the input pulley 11.

The PTO input shaft 10 carries, at the other end thereof distant from the engine 3, a coupling member 13 slidably splined on the shaft 10. Further, between the input pulley 11 and the input shaft 10 on the side of the engine 3, there is interposed a multiplate type friction clutch 14.

Figure 2:
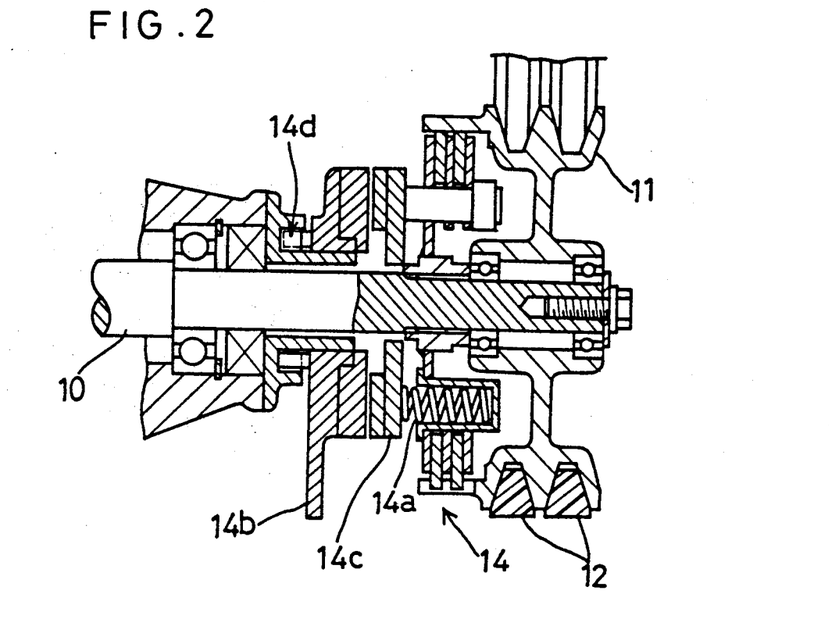
FIG. 2 is a side view in vertical section showing a friction clutch included in a PTO system of the vehicle.

As shown in FIG. 2, the friction clutch 14 is urged for engagement by means of a spring 14a incorporated in the clutch 14. When a control member 14b fitted on the input shaft 10 is pivoted, the control member 14b is moved rightwards in FIG. 2 by means of a cam mechanism 14d, and this pushes a control disc 14c of the clutch 14 on the side of the input shaft 10 so as to disengage the friction clutch 14. In the above operations, since the control member 14b is not pivotable beyond a predetermined stroke, with the disengaging operation of the friction clutch 14, friction between the control member 14b and the control disc 14c of the input shaft 10 provides a braking effect to the rotation of the input shaft 10 thus stopping the same.

Next, a propelling transmission construction of this work vehicle will be particularly described.

Figure 3:
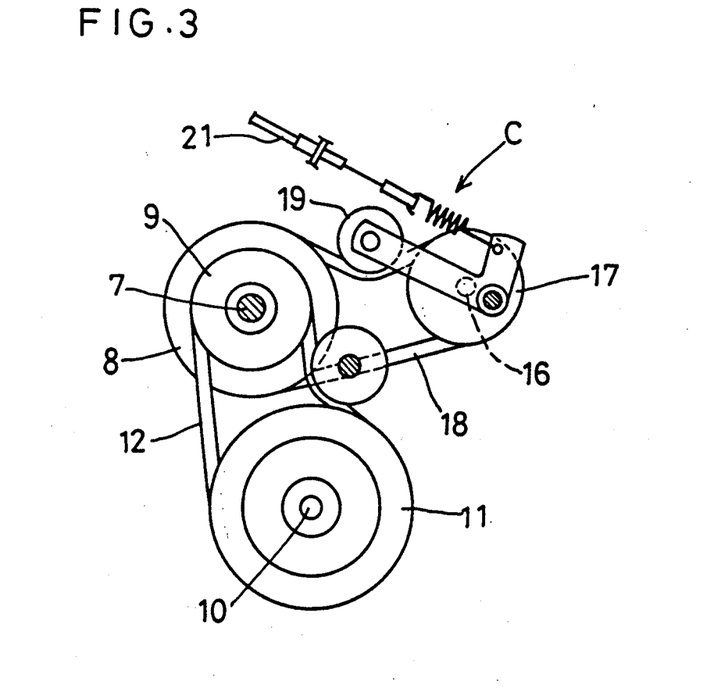
FIG. 3 is a view showing major portions of a main clutch included in a propelling system of the work vehicle.

As shown in FIGS. 1 and 3, at a lateral side of the transmission casing 1 adjacent the engine 3, there is attached a hydrostatic type stepless change-speed device 15 (to be referred briefly to as the HST hereinafter). This HST 15 has its input shaft 16 extending to the engine 3. Further, a further transmission belt 18 is entrained between and on an input pulley 17 fitted on the input shaft 16 and the aforementioned first output pulley 8 fitted on the output shaft 7 of the engine 3. Also, for this transmission belt 18, there is provided a transmission engaging/disengaging tension pulley 19. These elements together constitute a main clutch C.

Moreover, as shown in FIG. 1, the input shaft 16 of the HST 15 carries a cooling fan 16a for cooling the HST 15. An oil charging oil tank 15a is disposed above the HST 15.

Figure 4:
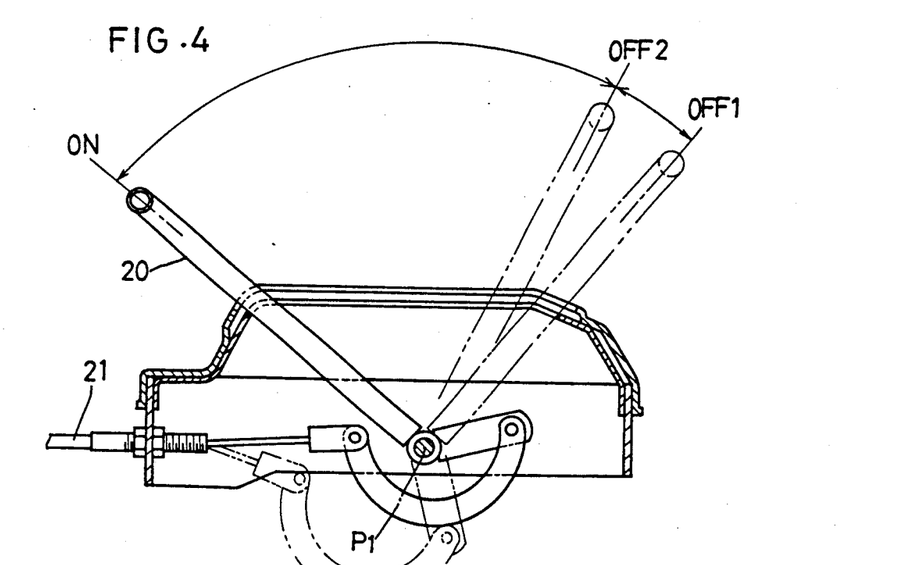
FIG. 4 is a side view showing operation positions of a first control lever.
Figure 5:
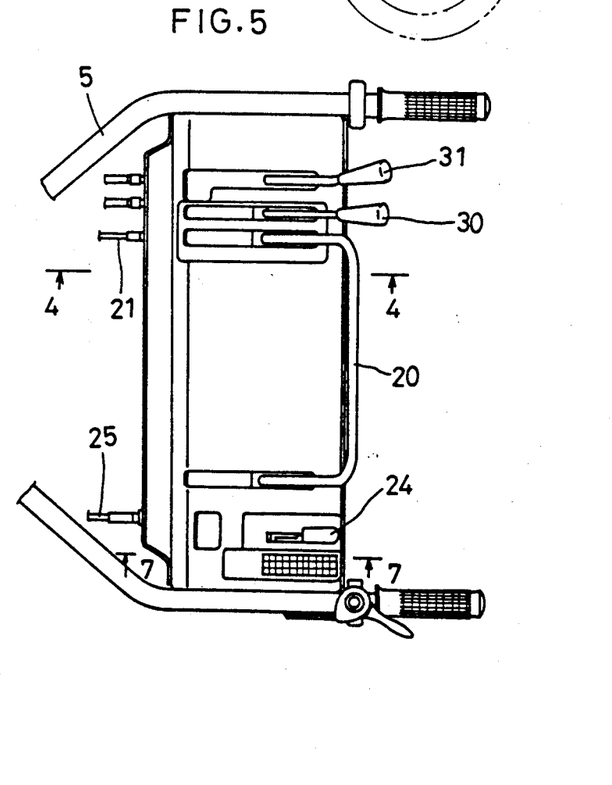
FIG. 5 is a plane view showing a control region of the vehicle including a steering handle.

Next, an operational relationship between the main clutch C and the HST 15 will be detailed. Referring now to FIGS. 3, 4 and 5, a first control lever 20, as a main clutch control means, is provided as being pivotable about a first horizontal axis P1 of the steering handle 5. And, this first control lever 20 is operatively connected with the tension pulley 19 via a cable 21. In operation, when the first control lever 20 is pivoted, the tension pulley 19 is moved to tense or relax the transmission belt 18, thus engaging or disengaging power transmission from the engine 3 to the HST 15.

Next, there will be described a control mechanism as a stepless change-speed device control means for controlling the HST 15.

Figure 6:
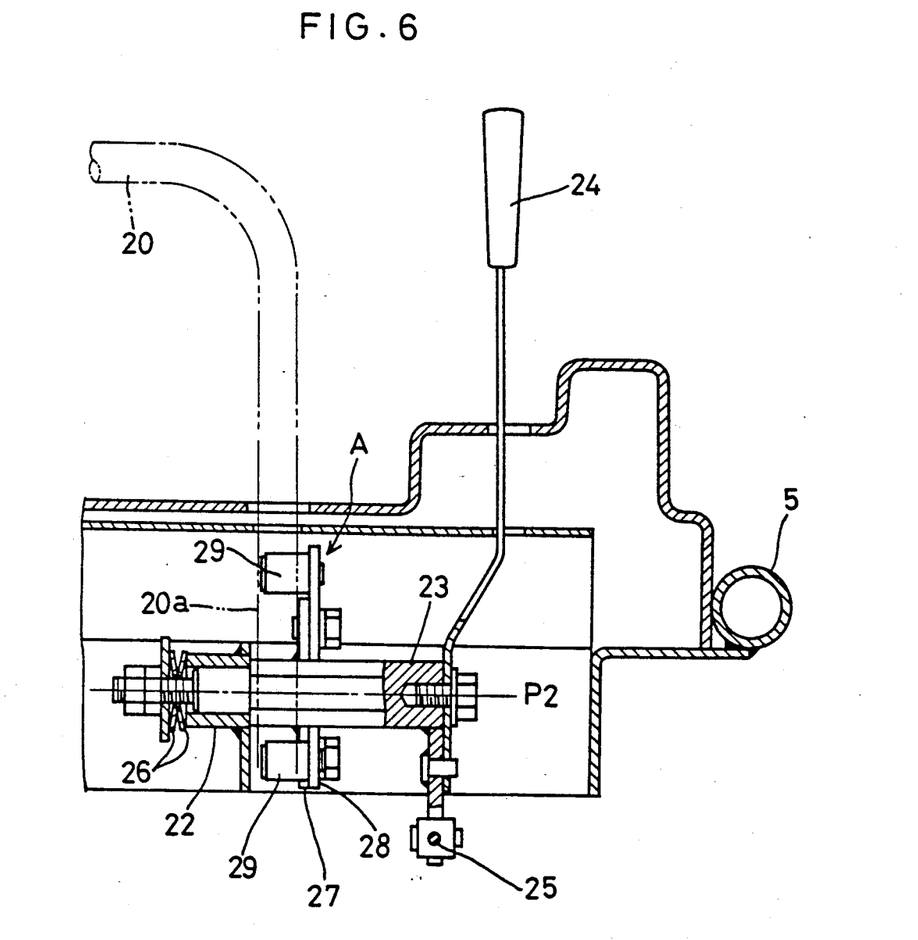
FIG. 6 is sectional front view showing a construction of a second control lever.
Figure 7:
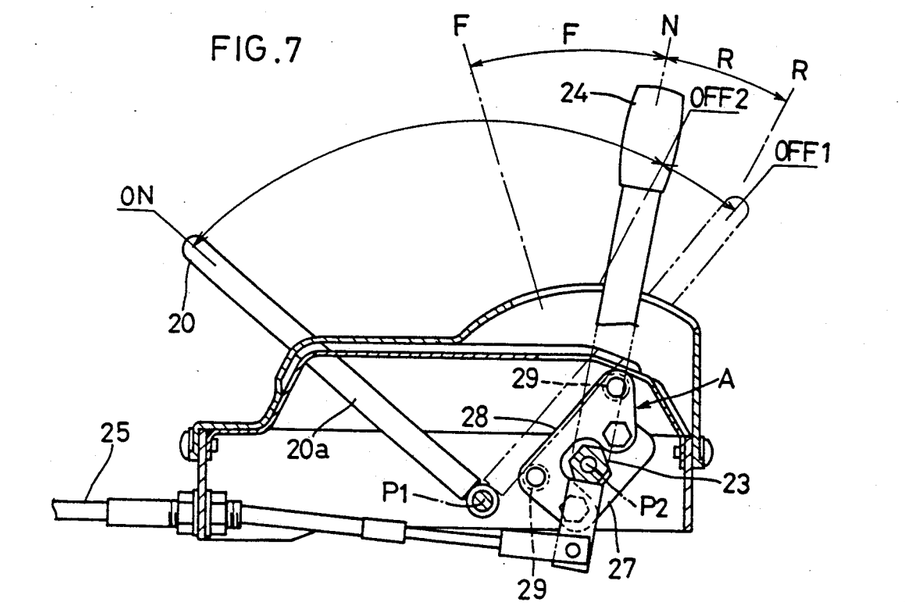
FIG. 7 is a side view illustrating a positional relationship between the first control lever and the second control lever at its neutral position.

As shown in FIGS. 6 and 7, a pivot shaft 23 is supported as being pivotable about a second horizontal axis P2 relative to a boss member 22, and a second control lever 24 formed of a plate spring is fixed to an outer end of the pivot shaft 23. And, this second control lever 24 is operatively connected with an unillustrated control portion of the HST 15 via a push-pull cable 25, so that the second control lever 24 is operable to a forward propelling position F and to reverse propelling position R across a neutral position N between the propelling positions F and R.

Further, the second control lever 24 is constantly urged in the lateral direction thereof by means of a disc spring 26 so that the lever 24 can be maintained at a desired position.

Figure 8:
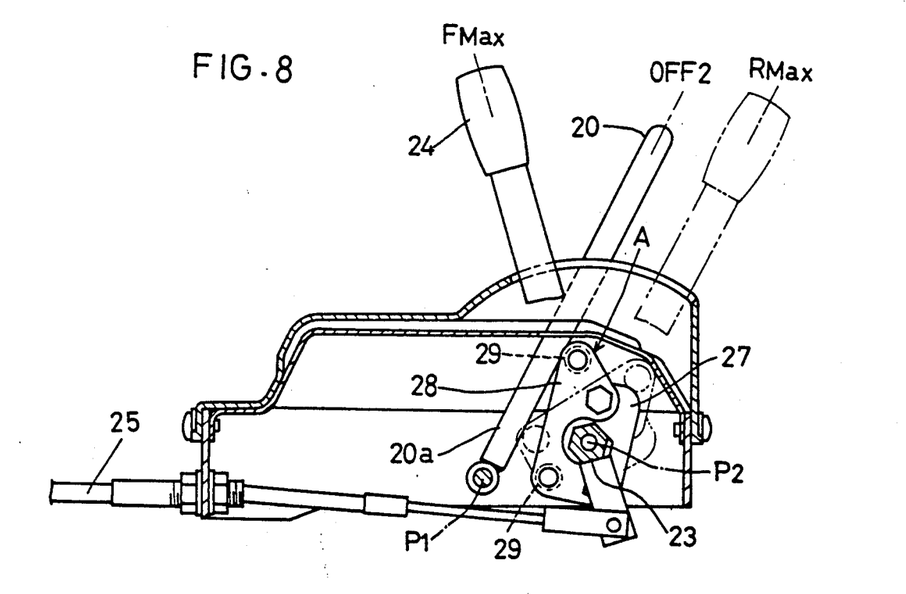
FIG. 8 is a side view illustrating a second declutching position of the first control lever.

As shown in FIGS. 7 and 8, the first control lever 20 for the main clutch C is reversibly operable to a clutching position ON, a second declutching position OFF2 and to a first declutching position OFF1 in this order. Further, a neutral return mechanism A is provided for forcibly returning the second control lever 24 from its current position to the neutral position. In the second declutching position OFF2 of the first control lever 20, only the main clutch C is disengaged. Whereas, in the second declutching position OFF1, the neutral return mechanism A is activated with a disengaging operation of the main clutch C.

The above construction will now be more particularly described. a flat plate type holding plate 28 is fixed by means of bolts to a bracket 27 fixed to the pivot shaft 23 having a hexagonal cross section. This holding plate 28 carries, at upper and lower portions thereof, rollers 29 and 29 rotatable about horizontal axes respectively. These elements together constitute the neutral return mechanism A. a right-side vertical pipe portion 20a as a mount base portion of the first control lever 20 is provided so as to come into abutment with the front and rear sides of the respective rollers 29 and 29 (see FIG. 6).

With the above-described construction in operation, if the first control lever 20 is operated to the first declutching position OFF1 beyond the second declutching position OFF2 when the second control lever 24 is currently held at either the forward propelling position F or the reverse propelling position R; then, as illustrated in FIG. 8, the right-side vertical pipe portion 20a of the first control lever 20 comes into abutment with an upper side of the holding plate 28, which currently assumes a posture denoted by a solid line or an alternate long and two short dashes line in FIG. 8, or with the lower roller 29, whereby the holding plate 28 is pushed back to the posture (the neutral position) illustrated in FIG. 7. Accordingly, the second control lever 24 is returned to the neutral position N thus stopping the HST 15. Further, since the first control lever 20 pushes down the upper face of the holding plate 28 via the roller 29, 29, the second control lever 24 remains unoperable unless the first control lever 20 is operated to the clutching position ON.

When the first control lever 20 is retained at the second declutching position OFF2, the rollers 29, 29 and the right-side vertical pipe portion 20a will not interfere with each other regardless of the current position of the second control lever 24 and only the main clutch C is disengaged in this second declutching position OFF2.

In other words, the second declutching position OFF2 is a position where the left-side vertical pipe portion 20a first comes into contact with either of the upper and lower rollers 29 and 29.

The above-described construction can be illustrated in a Table below:

|      | main clutch | HST  |
|------|-------------|------|
| ON   | on          | free |
| OFF1 | off         | off  |
| OFF2 | off         | free |

Further, in FIG. 5, a reference numeral 30 denotes a PTO lever for engaging and disengaging the friction clutch 14. Numeral 31 denotes a forward-reverse switch lever for switching over the rotational direction of the PTO input shaft between the forward direction and the reverse direction.

Next, a construction of the transmission unit employed in this embodiment will be described.

Figure 9:
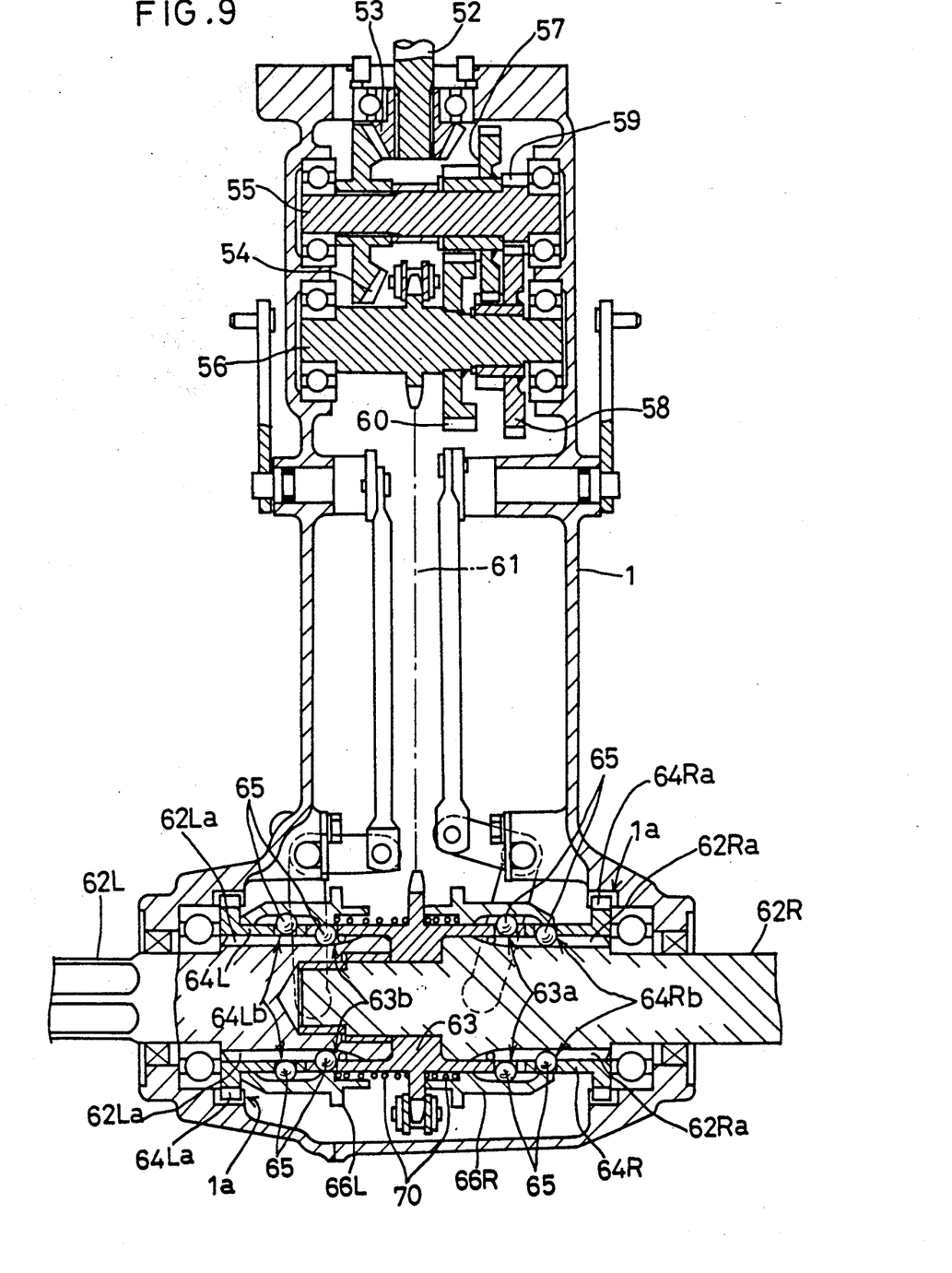
FIG. 9 is a front view in vertical section showing a transmission casing.

Referring to FIG. 9, an output shaft 52 of the HST 15 extends into the transmission casing 1, so that power of this output shaft 52 is transmitted through a first bevel gear 53 and a second bevel gear 54 to a first transmission shaft 55. A second transmission shaft 56 is provided in parallel with the first transmission shaft 55. The first transmission shaft 55 rotatably mounts thereon a first gear pair 57, while the second transmission shaft 56 rotatably mounts thereon a second gear pair 58. In operation, power of the first transmission shaft 55 is transmitted through a third gear 59, the second gear pair 58, the first gear pair 57 and a fourth gear 60 to the second transmission shaft 56.

Further, this power of the second transmission shaft 56 is transmitted via a transmission chain 61 to axles 62R and 62L carrying the right and left propelling wheels 4 respectively. The right and left axles 62R and 62L are supported so as to be rotable independently of each other. This independently rotatable construction of the axles 62R and 62L will be detailed next. Over opposing center ends of the axles 62R and 62L, there is mounted a hollow input shaft 63 to be rotatable relative to the axles 62R and 62L, and the drive chain 61 is entrained about the hollow input shaft 63. Further, over the side portions of the axles 62R and 62L, there are mounted cylindrical members 64R and 64L, respectively. As engaging portions 64Ra and 64La of these cylindrical members 64R and 64L are engaged with stopper portions 1a formed in an interior face of the transmission casing 1, the cylindrical members 64R and 64L are fixed to the transmission casing 1.

Further, two pairs of holes 63a and 63b are formed at right and left ends of the hollow input shaft 63; whereas, further two pairs of holes 64Rb and 64Lb are formed respectively on the cylindrical members 64R and 64L and elongated recesses 62Ra and 62La are formed on the respective axles 64R and 64L. These holes 63a, 63b ... respectively retain therein balls 65.

In the condition shown on the left side portion of FIG. 9, a cylindrical switching member 66L is slided outwards, wherein the balls 65 of the hollow input shaft 63 are pushed into the hole 63b of the input shaft 63 and the recess 62La of the axle 62L, so that the axle 62L is rotatably driven together with the hollow input shaft 63. In this condition, rotary motion of the axle 62L prevents the ball 65 of the cylindrical member 64L from being pushed into the recess 62La of the axle 62L.

In the condition shown on the right side portion of FIG. 9, a further cylindrical switching member 66R is slided inwards, i.e. towards the hollow input shaft 63, so that the switching member 66R pushes the balls 65 of the cylindrical member 64R into the opening 64Rb of the cylindrical member 64R and the recess 62Ra of the axle 62R, thus locking the axle 62R to the transmission casing 1. In this case, rotary motion of the hollow input shaft 63 prevents the ball 65 of the hollow input shaft 63 from being pushed into the recess 62Ra of the axle 62R.

As described above, with a sliding operation of both or either of the right and left switching members 66R and 66L, the axles 62R and 62L are driven or stopped to make a turn. Further, a spring 70 is provided for urging these switching members 66R and 66L towards the cylindrical members 64R and 64L, respectively.

One alternate embodiment of the present invention will be described next.

A construction of this further embodiment differs from that of the foregoing embodiment in the construction of the neutral return mechanism A, while the rest of the constructions being the same.

Figure 10:
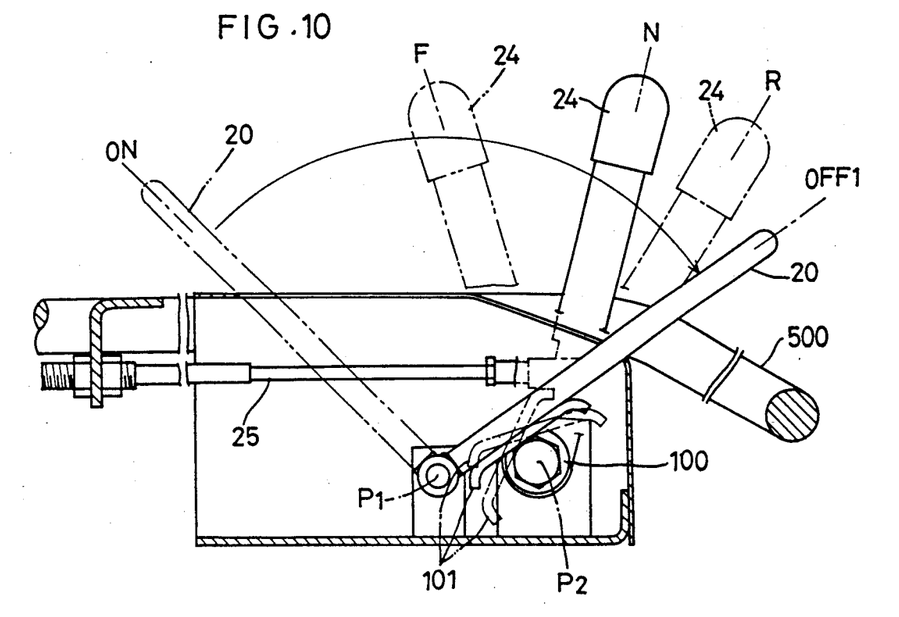
FIG. 10 is a side view in vertical section showing vicinity of a mount base of the first and second control levers relating to another embodiment of the invention.
Figure 11:
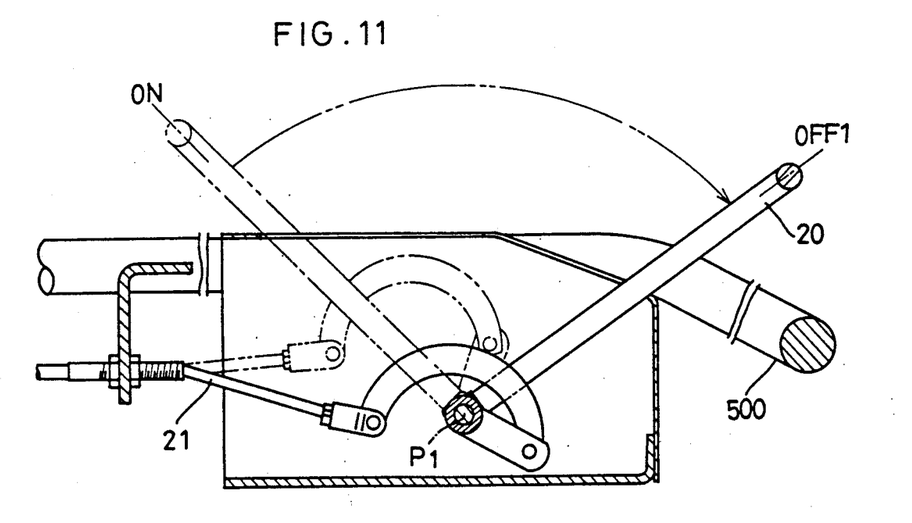
FIG. 11 is a side view in vertical section showing the other side of the vicinity of the mount base shown in FIG. 10.
Figure 14:
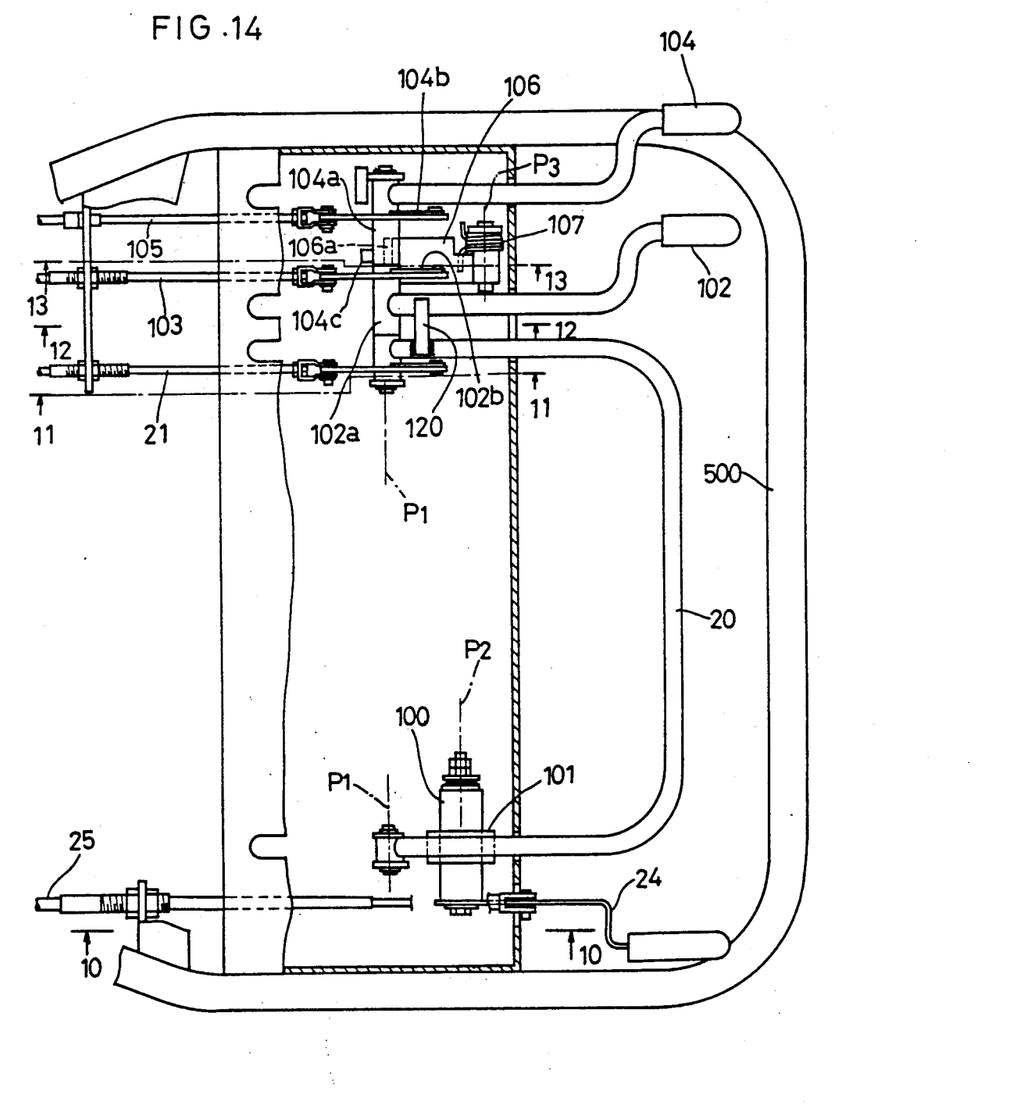
FIG. 14 is an overall front view of a steering handle relating to the further embodiment of the invention.

As shown in FIGS. 10 and 14, a boss member 100 is supported as being pivotable about the second horizontal axis P2. And, to an outer end of this bass member 100, the second control lever 24 for controlling the HST 15 is fixed. And, this second control lever 24 is operatively connected with the unillustrated control portion of the HST 15 via the push-pull cable 25, so that the second control lever 24 is operable to the forward propelling position F and to the reverse propelling position R across the neutral position N between the propelling positions F and R.

As shown in FIGS. 10 and 14, a flat plate member 101 is fixed to the boss member 100. In operation, if the first control lever 20 is operated from the clutching position ON to the first declutching position OFF1 when the second control lever 24 is currently held at either the forward propelling position F or the reverse propelling position R; then, the first control lever 20 comes into abutment with an upper or lower side of the plate member 101 which currently assumes a posture denoted by a solid line or an alternate long and two short dashes line, whereby the flat plate member 101 is pushed back to the posture (the neutral position N) denoted with a solid line. Accordingly, the second control lever 24 is returned to the neutral position N thus stopping the HST 15. Further, since the first control lever 20 pushes down the upper face of the flat plate member 101, the second control lever 24 remains unoperable unless the first control lever 20 is operated to the clutching position ON.

Next, the other control mechanisms employed in the construction of this embodiment will be described.

FIG. 14 is an overall plane view of the steering handle 5 used in this embodiment.

Figure 12:
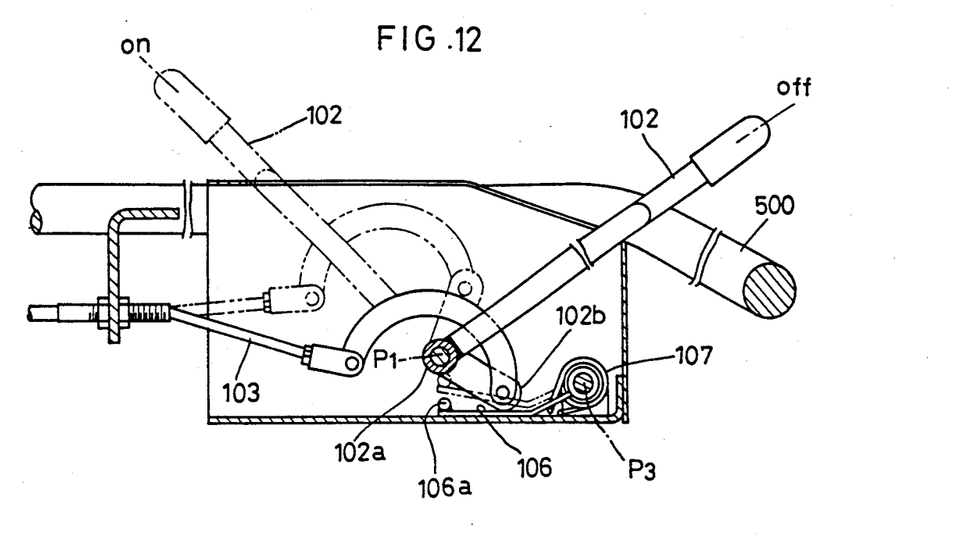
FIG. 12 is a side view in vertical section showing vicinity of a mount base of a PTO lever relating to the further embodiment of FIG. 10.

As shown in FIG. 14 and also in FIG. 12, a PTO lever 102 is supported as being pivotable about the first horizontal axis P1, and a control arm 102b fixed to a boss portion 102a of this PTO lever 102 is operatively connected with the control member 14b of the friction clutch 14 shown in FIGS. 1 and 2, via a cable 103. Accordingly, with a pivotal operation of the PTO lever 102, the friction clutch 14 is engaged or disengaged.

Figure 13:
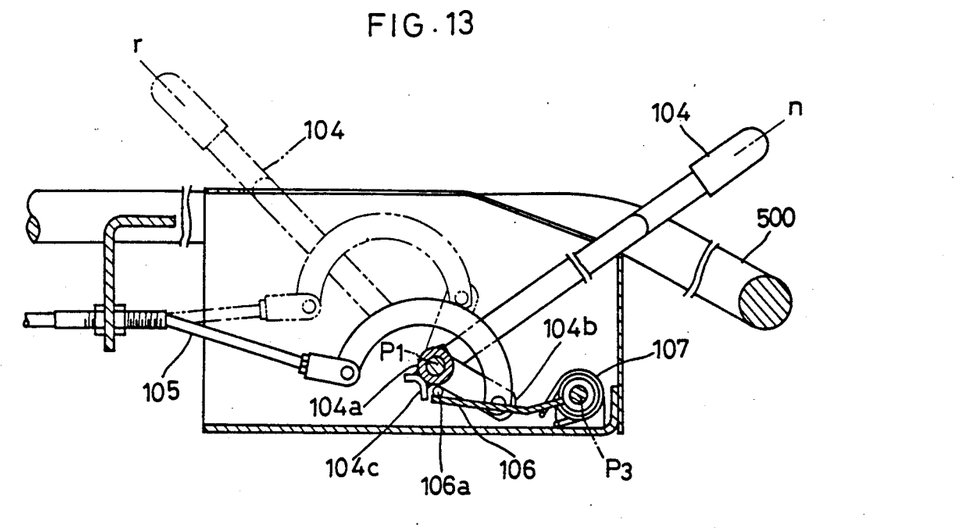
FIG. 13 is a side view in vertical section showing a mount base of a forward-reverse switch lever relating to the further embodiment of FIG. 10.

Further, as shown in FIGS. 13 and 14, a forward-reverse switch lever 104 is supported as being pivotable about the first horizontal axis P1, and a control arm 104b fixed to a boss portion 104a of this forward-reverse switch lever 104 is operatively connected with an unillustrated, forward-reverse control portion of the rotary mower 6 of FIG. 1, via a cable 105. Moreover, a restraining plate 106 is supported as being pivotable about a third horizontal axis P3, with the restraining plate 106 being pivotably urged upwards by means of a coil spring 107.

With the above-described construction in operation, if the PTO lever 102 is operated to an clutching position (on) when the forward-reverse switch lever 104 is currently retained at its forward propelling position or its reverse propelling position, the retaining plate 106 is pushed upwards by the urging force of coil spring 107, as illustrated in FIGS. 12 and 14. In this condition, even if the user attempts to operate the forward-reverse switch lever 104, as shown in FIGS. 13 and 14, an abutment 104c fixed to a boss portion 104a of the switch lever 104 comes into abutment against a pin 106a fixed to a leading end of the restraining plate 106, whereby the user can not operate the forward-reverse switch lever 104.

Conversely, if the PTO lever 102 is operated to a declutching position (off), as shown in FIGS. 12 and 14, the control arm 102b of the PTO lever 102 pushes up the restraining plate 106, whereby the forward-reverse switch lever 104 becomes operable by the user.

Furthermore, as illustrated in FIG. 14, a pin 120 is fixed to the first control lever 20, with the pin 120 being extended into the operation path of the PTO lever 102. With this arrangement, if the first control lever 20 alone is operated to the declutching position (off) from a condition where both the first control lever 20 and the PTO lever 102 are currently held at the clutching positions, the pin 120 of the first control lever 20 comes into abutment against the PTO lever 102, thus operating also the PTO lever 102 to its declutching position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A change-speed construction for a propelling system of a work vehicle, said construction comprising:
    a main clutch;
    a stepless change-speed device;
    main clutch control means selectively operable between a clutching position for engaging said main clutch, a first declutching position for disengaging said main clutch, and a second declutching position for disengaging said main clutch;
    stepless change-speed device control means adjustable at least to a neutral position for retaining said stepless change-speed device at a neutral position; and
    a neutral return mechanism for causing said stepless change-speed device to return to the neutral position and maintaining said change-speed device thereat when said main clutch control means is operated to said first declutching position, allowing said stepless change-speed device control means to be freely adjusted when said main clutch control means is operated to said second declutching position, and allowing said stepless change-speed device control means to be freely adjusted when said main clutch control means is operated to said clutching position.

2. A change-speed construction as defined in claim 1 wherein said main clutch control means is operable to shift to said clutching position, said second declutching position, and said first declutching position in the mentioned order and in the reversed order.

3. A change-speed construction as defined in claim 1, wherein said main clutch control means is a first control lever pivotable about a first horizontal axis;
    said stepless change-speed device control means being a second control lever pivotable about a second horizontal axis;
    and said neutral return mechanism being provided between a mount base portion of said first control lever and a pivot shaft pivotable about said second horizontal axis together with said second control lever.

4. A change-speed construction as defined in claim 3, wherein said neutral return mechanism includes said mount base portion of the first control lever and a pair of rollers attached to said pivot shaft through a holding plate and extending in parallel with said second horizontal axis.

5. A change-speed construction as defined in claim 4, wherein when said mount base portion of said first control lever comes into contact with either of the pair of said rollers, said main clutch alone is disengaged.

6. A change-speed construction as defined in claim 3, wherein said neutral return mechanism includes said mount base portion of said first control lever and a flat plate member attached to said pivot shaft.

7. A change-speed construction for a propelling system of a work vehicle, said construction comprising:
   a main clutch;
   a stepless change-speed device;
   a main clutch control means having a clutching position for engaging said main clutch and a first declutching position for disengaging said main clutch, said main clutch control means having a first control lever pivotable about a first horizontal axis;
   a stepless change-speed device control means having a neutral position for retaining said stepless change-speed device at a neutral position, said stepless change-speed device control means having a second control lever pivotable about a second horizontal axis; and
   a neutral return mechanism for causing said stepless change-speed device to return to the neutral position and maintaining said change-speed device thereat when said main clutch control means is operated to said first declutching position and also for permitting said stepless change-speed device control means from the neutral position when the main clutch control means is operated to said clutching position, said neutral return mechanism being provided between a mount base portion of said first control lever and a pivot shaft pivotable about said second horizontal axis together with said second control lever, wherein said neutral return mechanism includes said mount base portion of the first control lever and a pair of rollers attached to said pivot shaft through a holding plate and extending in parallel with said second horizontal axis.

8. A change-speed construction as defined in claim 7, wherein when said mount base portion of said first control lever comes into contact with either of the pair of said rollers, said main clutch alone is disengaged.

* * * * *

UNITED STATES PATENT AND TRADEMARK OFFICE
CERTIFICATE OF CORRECTION

PATENT NO. : 5,033,594

DATED : July 23, 1991

INVENTOR(S) : Arinobu Ishida, Toshihiko Kusano, Naotaka Kanai, Toshiyuki Matsumoto, Shinichi Takeda, Hiroshi Nishikawa and Tokio Horikawa It is certified that error appears in the above-identified patent and that said Letters Patent is hereby corrected as shown below:

Column 1 Line 29 "changes-speed" should read --change-speed--.

Column 2 Line 23 "bidirectionally" should read --bi-directionally--.

Column 5 Line 14 "a" should read --A--.

Column 5 Line 20 "a" should read --A--.

Column 5 Line 36 "dashes line" should read --dashed lines--.

Column 7 Line 9 "bass" should read --boss--.

Column 7 Line 27 "dashes line" should read --dashed lines--.

Column 7 Line 61 "an" should read --a--.

Signed and Sealed this

Twenty-second Day of December, 1992

Attest:

DOUGLAS B. COMER

*Attesting Officer*   *Acting Commissioner of Patents and Trademarks*